US012718512B2

(12) United States Patent
Yin et al.

(10) Patent No.: US 12,718,512 B2
(45) Date of Patent: Aug. 25, 2026

(54) ROTATED OBJECT DETECTION

(71) Applicant: International Business Machines Corporation, Armonk, NY (US)

(72) Inventors: Kun Yan Yin, Ningbo (CN); Yuan Yuan Ding, Shanghai (CN); Zhi Xing Peng, Beijing (CN); Fei Wang, Dalian (CN); Yue Liu, Ningbo (CN)

(73) Assignee: International Business Machines Corporation, Armonk, NY (US)

( * ) Notice: Subject to any disclaimer, the term of this patent is extended or adjusted under 35 U.S.C. 154(b) by 390 days.

(21) Appl. No.: 18/417,302

(22) Filed: Jan. 19, 2024

(65) Prior Publication Data

US 2025/0239041 A1 Jul. 24, 2025

(51) Int. Cl.

*G06V 10/25* (2022.01)
*G06T 3/60* (2024.01)
*G06T 7/162* (2017.01)
*G06V 10/24* (2022.01)
*G06V 10/82* (2022.01)

(52) U.S. Cl.

CPC ................ *G06V 10/25* (2022.01); *G06T 3/60* (2013.01); *G06T 7/162* (2017.01); *G06V 10/242* (2022.01); *G06V 10/82* (2022.01); *G06T 2207/20081* (2013.01); *G06T 2207/20084* (2013.01); *G06V 2201/07* (2022.01)

(58) Field of Classification Search

CPC .... G06V 10/242; G06V 10/82; G06V 10/454; G06V 2201/07; G06V 10/25; G06V 10/24; G06T 2207/20081; G06T 2207/20084; G06T 7/162; G06T 3/60–608; G06N 3/02–0985

See application file for complete search history.

(56) References Cited

U.S. PATENT DOCUMENTS

2020/0410252 A1* 12/2020 Tsoi ........................ G06F 18/23
2022/0189040 A1 6/2022 Baeg et al.
2025/0078450 A1* 3/2025 Zhong ................... G06V 10/82

FOREIGN PATENT DOCUMENTS

CN 106980895 A 7/2017
CN 112861744 A * 5/2021 ............ G06N 3/045

(Continued)

OTHER PUBLICATIONS

He, Jiaying, and KL Eddie Law. “Deep learning models for rotated object detection in aerial images: survey and performance comparisons.” IEEE Access 12 (2024): 180436-180457. (Year: 2024).*

(Continued)

*Primary Examiner* — Geoffrey E Summers

(74) *Attorney, Agent, or Firm* — Scully, Scott, Murphy & Presser, P.C.; Caleb Wilkes

(57) ABSTRACT

At least one processor determines bounding boxes in an image using a neural network. At least one processor extracts an initial bounding box for an object in the image. At least one processor selects a cluster center of the bounding boxes and circumscribes a cluster box around the cluster center. At least one processor rotates the initial bounding box and contents of the initial bounding box according to a rotation angle determined based on the cluster box. At least one processor detects the object in the rotated initial bounding box using a trained machine learning model.

20 Claims, 7 Drawing Sheets

(56) References Cited

FOREIGN PATENT DOCUMENTS

| | | | | |
|---|---|---|---|---|
| CN | 113420648 A | * | 9/2021 | ......... G06F 18/2415 |
| CN | 114677498 A | * | 6/2022 | ....... G06F 18/23213 |

OTHER PUBLICATIONS

Xie, Xingxing, et al. "Oriented R-CNN for Object Detection." 2021 IEEE/CVF International Conference on Computer Vision (ICCV). IEEE, 2021. (Year: 2021).*

Fang, Fen, et al. "Combining faster R-CNN and model-driven clustering for elongated object detection." IEEE transactions on image processing 29 (2019): 2052-2065. (Year: 2019).*

Qin, Ran, et al. "MRDet: A multihead network for accurate rotated object detection in aerial images." IEEE Transactions on Geoscience and Remote Sensing 60 (2021): 1-12. (Year: 2021).*

Yao, Yanqing, et al. "On improving bounding box representations for oriented object detection." IEEE Transactions on Geoscience and Remote Sensing 61 (2022): 1-11. (Year: 2022).*

International Searching Authority, "Notification of Transmittal of the International Search Report and the Written Opinion of the International Searching Authority, or Declaration," Patent Cooperation Treaty, Feb. 20, 2025, 12 pages, International Application No. PCT/ IB2024/061493.

Mohammadi Mohammad Reza, "Deep Multiple Instance Learning for Airplane Detection in High Resolution Imagery", Machine Vision and Applications 32(1), DOI:10.1007/s00138-020-01153-7, Jan. 2021, 14 pages.

Wen et al., "A comprehensive survey of oriented object detection in remote sensing images", Expert Systems with Applications, vol. 224, Aug. 15, 2023, 16 pages.

Yi et al., "Image Segmentation: A Survey of Graph-cut Methods", International Conference on Systems and Informatics (ICSAI 2012) XP32192906, 2012, pp. 1936-1941.

Chen, H., et al., "Rotate-Yolov5 for Aerial Images", 2022 6th International Conference on Machine Vision and Information Technology (CMVIT 2022), Feb. 25, 2022, pp. 1-7, vol. 2278.

Ding, J., et al., "Learning RoI Transformer for Oriented Object Detection in Aerial Images", 2019 IEEE/CVF Conference on Computer Vision and Pattern Recognition (CVPR), Jun. 15-20, 2019, pp. 2849-2858.

Li, J., et al., "Oriented Object Detection in Remote Sensing Images with Anchor-Free Oriented Region Proposal Network", Remote Sens. 2022, Received Jan. 19, 2022, Accepted Mar. 1, 2022, Published Mar. 3, 2022, pp. 1-21, 14, 1246.

Qin, R., et al., "MRDet: A Multi-Head Network for Accurate Rotated Object Detection in Aerial Images", IEEE Transactions on Geoscience and Remote Sensing, Mar. 2021, pp. 1-12, vol. 14, No. 8.

Thakallapelli, "Real-time Frequency Based Reduced Order Modeling of Large Power Grid", 2016 IEEE Power and Energy Society General Meeting (PESGM), Jul. 17-21, 2016, 6 pages.

Wu, J., et al., "Object Detection of Flexible Objects with Arbitrary Orientation Based on Rotation-Adaptive YOLOv5", Sensors, 2023, Received Mar. 9, 2023, Revised Apr. 22, 2023, Accepted May 18, 2023, Published May 20, 2023, pp. 1-22, 23, 4925.

Yu, X., et al., "Oriented Object Detection in Aerial Images Based on Area Ratio of Parallelogram", arXiv:2109.10187v5 [cs.CV], Submitted on Sep. 21, 2021 (v1), last revised Nov. 8, 2021 (v5), 29 pages.

Zand, M., et al., "Oriented Bounding Boxes for Small and Freely Rotated Objects", arXiv:2104.11854v1 [cs.CV], Apr. 24, 2021, 14 pages.

Zhu, T., et al., "Knowledge Combination to Learn Rotated Detection Without Rotated Annotation", arXiv:2304.02199v2 [cs.CV], May 4, 2023, pp. 1-10.

* cited by examiner

ROTATED OBJECT DETECTION

BACKGROUND

The present application relates generally to computers and computer applications, and more particularly to machine learning and object detection such as rotated object detection.

BRIEF SUMMARY

The summary of the disclosure is given to aid understanding of a computer system and method of rotated object detection, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or their method of operation to achieve different effects.

A computer-implemented method in some embodiments includes determining bounding boxes in an image using a neural network. The computer-implemented method also includes extracting an initial bounding box for an object in the image. The computer-implemented method also includes selecting a cluster center of the bounding boxes and circumscribing a cluster box around the cluster center. The computer-implemented method also includes rotating the initial bounding box and contents of the initial bounding box according to a rotation angle determined based on the cluster box. The computer-implemented method also includes detecting the object in the rotated initial bounding box using a trained machine learning model.

A computer system and a computer program product configured to achieve or cause the method described above are also disclosed herein.

Further features as well as the structure and operation of various embodiments are described in detail below with reference to the accompanying drawings. In the drawings, like reference numbers indicate identical or functionally similar elements.

DETAILED DESCRIPTION

Figure 1:
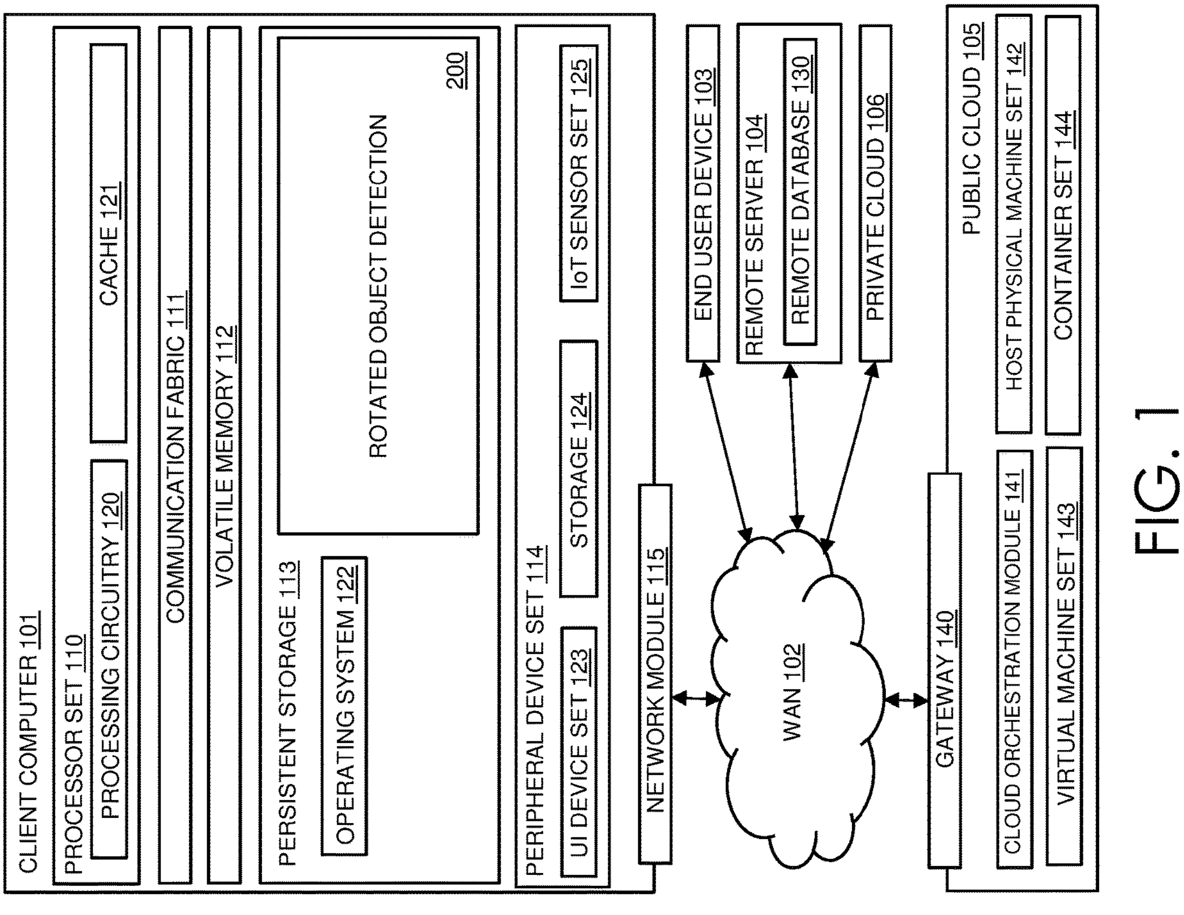
FIG. 1 shows an example of a computing environment, which can implement rotated object detection in some embodiments.

In an aspect, there is provided a computer-implemented method to determine bounding boxes in an image using a neural network, extract an initial bounding box for an object in the image, select a cluster center of the bounding boxes and circumscribe a cluster box around the cluster center, rotate the initial bounding box and contents of the initial bounding box according to a rotation angle determined based on the cluster box, and detect the object in the rotated initial bounding box using a trained machine learning model.

The method allows for detecting rotated objects in an image without having to retrain a machine learning model such as a neural network with new training data to include different rotational views of the objects. In this way, for example, training data size for training a machine learning model can be reduced. Reducing the amount of data (e.g., training data size) that needs to be processed can relieve computation resources to perform other processing tasks and can increase computational processing speed as a result. Further, once trained, a machine learning model can be used to detect objects that are rotated, without having to retrain the model with additional training data, which further relieves use of computational resources.

One or more of the following features can be separable or optional from each other. For example, in some embodiments, the computer-implemented method also includes extracting a region of interest grab box by iteratively performing a graph cut algorithm starting with the cluster box as an initial area and obtaining a segmented area, wherein the segmented area is used as the initial area in a next iteration, and wherein the iterations continue until a criterion is met; and adjusting a size of the initial bounding box based on the region of interest grab box, where the detecting the object using the trained machine learning model occurs with the size-adjusted initial bounding box. In this way, bounding boxes that are more focused on a potentially rotated object can be identified.

In some embodiments, the computer-implemented method also includes training the neural network by using an intersection over union value as a respective mask of a true positive determination for a loss function for the neural network. In this way, for example, additional bounding boxes may be detected allowing for finding those containing an object in the image with higher degree of confidence.

In some embodiments, a non-maximum suppression process is performed to select the initial bounding box among the bounding boxes. In this way, a bounding box is identified, which has the highest degree of confidence that the bounding box contains an object in the image.

In some embodiments, selecting of the cluster center of the bounding boxes, includes determining a representative pixel point within each of the bounding boxes, clustering representative pixel points of the bounding boxes, and identifying a cluster with highest density region of representative pixel points. In this way groups of pixels are defined and identified to help achieve pre-processing for computer vision and image recognition performed automatically.

In some embodiments, the criterion is met if a difference in size of the segmented area and the initial area is less than a predefined threshold. In this way, the method controls when to stop the iteration, for example, based on the predefined threshold, and alternation between estimation and parameter learning helps perform energy minimization instead of performing one-shot learning.

In some embodiments, the rotation angle of the initial bounding box is determined by finding a central axis of the initial bounding box, rotating the central axis by an angle repeatedly until pixel points in the cluster box are divided into two equivalent parts by the central axis, wherein the angle at which the pixel points in the cluster box are divided into two equivalent parts by the central axis is used as a target rotation angle. In this way, for example, a rotation angle can be identified based on center points of candidate bounding boxes of an object that appears rotated in the image.

In some embodiments, the adjusting the size of the size of the initial bounding box includes adjusting edges of the initial bounding box based on an intersection-over-union value of the region of interest grab box and the initial bounding box. In this way, the initial bounding box is better aligned with the content in the region of interest grab box, thereby improving a bounding box localization around the object that appears rotated in the image.

A system including at least one computer processor and at least one memory device coupled with the at least one computer processor is also disclosed, where the at least one computer processor is configured to perform one or more methods described above. A computer program product is also disclosed that includes a computer readable storage medium having program instructions embodied therewith, where the program instructions are readable by a device to cause the device to perform one or more methods described above.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as rotated object detection code 200. In addition to rotated object detection code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and rotated object detection code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in rotated object detection code 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in rotated object detection code 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computer 101 in some embodiments also hosts one or more machine learning models such as an object detection machine learning model. A machine learning model in one embodiment is stored in the persistent storage 113 of the computer 101. A received image is input to the machine learning model via an intra-computer transmission within the computer 101, e.g., via the communication fabric 111, to a different memory region hosting the machine learning model.

In some embodiments, one or more machine learning models are stored in computer memory of a computer positioned remotely from the computer 101, e.g., in a remote server 104 or in an end user device 103. In this embodiment, the code 200 works remotely with this machine learning model to train same and to utilize same. Training instructions are sent via a transmission that starts from the computer 101, passes through the WAN 102, and ends at the destination computer that hosts the machine learning model. Thus, in some embodiments the code 200 at the computer 101 or another instance of the software at a central remote server performs routing of training instructions to multiple server/geographical locations in a distributed system.

In such embodiments, a remote machine learning model is configured to send its output back to the computer 101 so that inference and rotated object detection results from using the trained model, neural network, and/or object rotator to analyze a rotated object image portion are provided and presented to a user. The machine learning model receives a copy of the new data sample, performs machine learning analysis on the received sample, and transmits the results, e.g., an output such as a classification of detection object back to the computer 101 for presentation there, e.g., via a display screen of the UI device set 123.

While traditional machine learning or computer vision object detection methods and annotation tools support vertical and horizontal object detection and calibration, in a real world scenarios, many objects appear in arbitrary angles. For instance, objects can be placed and images taken at different locations at various rotational views. Systems and methods are disclosed for object detection that detect objects appearing in different rotation angles in images such as, but not limited to, satellite cloud images, navigational and other scenes. The systems and methods in some embodiments do not need to increase the annotation workload in performing the objection detection of rotated objects.

In some embodiments, a system and/or method uses annotations which are of vertical or horizontally placed objects to train an object detection machine learning model, receives new images and automatically detects an object in the received image and that is rotated with respective to a vertical and/or horizontal orientation, and returns the coordinates and angles of the rotated object, for example, of a rotated bounding box. The bounding box is then rotated and input into the trained machine learning model. By feeding an image which entirely or partially has been rotated to be put into a vertical and/or horizontal orientation allows the trained machine learning model to successfully perform object detection. A bounding box refers to a rectangle that surrounds an object in an image. A bounding box has attributes associated with it such as its position or location (e.g., x-y pixel coordinates in an image), size (e.g., width and length by pixels), and one or more types of objects (e.g., class) contained in the bounding box. In response to being input into a neural network or into some types of machine learning models, the machine learning model or neural network generates a confidence score for the classified object in the bounding box. The confidence score is a likelihood or probability that the types of objects are contained in the bounding box. The system and/or method of the present embodiments disclosed herein are especially useful and practical where labeling data can get very tedious. Existing horizontal and/or vertical annotations and methods thereof may still be used to label data, and the system and/or method disclosed herein in some embodiments detect or identify objects with rotations using the machine learning model that was trained with the images labelled with the objects in the horizontal and/or vertical orientation and without the model needing any labelled training data for images of objects that are oriented differently from the horizontal and/or vertical orientation.

For example, an object detection machine learning model is trained to recognize images of airplanes, but the training images with annotations include airplanes who are oriented traditionally (e.g., axis-aligned) in the image view, e.g., with a longitudinal axis of the airplane running colinear or parallel to either (A) vertical perpendicular lines running through the image (usually a rectangular or sometimes square-shaped image) or (B) horizontal perpendicular lines running through the image. If an image is captured with airplanes but the airplanes have a rotated position compared to the traditional orientation, e.g., with a longitudinal axis of the airplane running through and intersecting various vertical perpendicular lines running through the image or through and intersecting various horizontal perpendicular lines running through the image, then a machine learning model trained with the traditional annotations may recognize the presence of some object in the image but sometimes or often fails to classify that object as an airplane. Using the embodiments disclosed herein, the automated rotation can be successful to create an altered rotated image so that components shown in the rotation are more recognizable by the machine learning model trained with traditionally oriented objects.

Figure 2A:
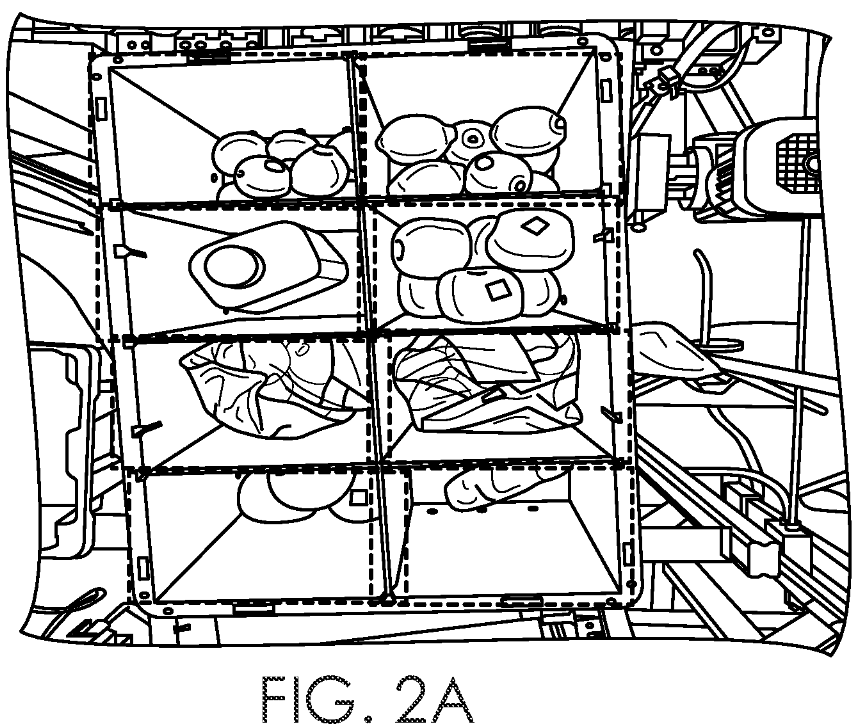
FIG. 2A shows an example image with bounding boxes in some embodiments.
Figure 2B:
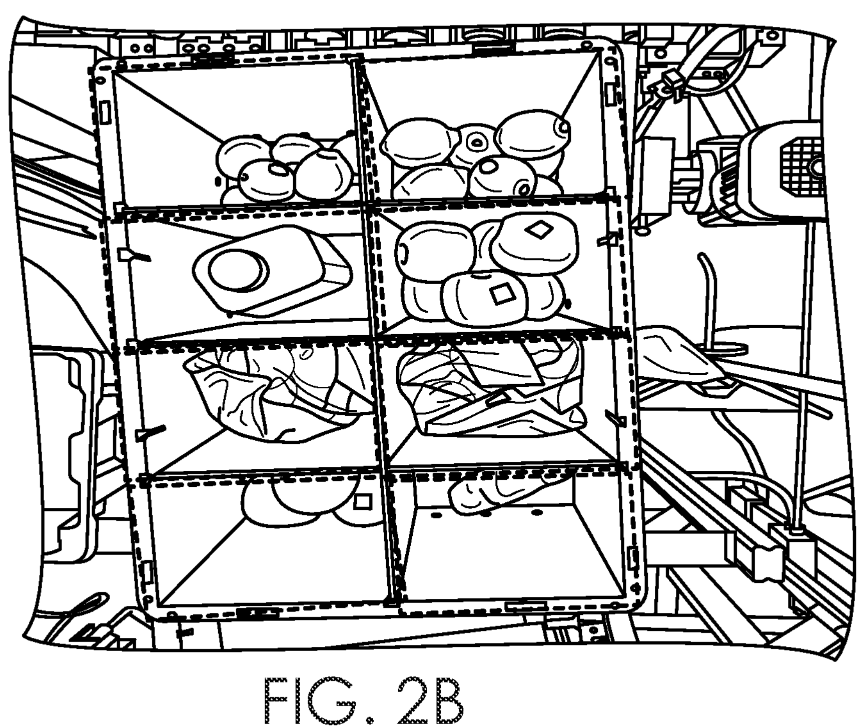
FIG. 2B shows an example image with bounding boxes having rotated objects in some embodiments.

FIGS. 2A and 2B illustrate example images in some embodiments related to product positioning, classification and counting in a store. Image processing captures the images of the products, classifies objects in the images (e.g., via object detection using machine learning), and counts the objects, for example, for inventory purposes or for other uses. For completing this inventory process, an automated tool should effectively detect and locate grids (e.g., bounding boxes having objects) in the image. To complete the whole process, the first step is to effectively detect and locate each grid in the scene. FIG. 2A shows an image with bounding boxes in some embodiments. FIG. 2B shows an image with those bounding boxes of FIG. 2A at a rotated angle in some embodiments so that the boxes are not axis-aligned, e.g., oriented colinear, parallel, or perpendicular to vertical and/or horizontal lines running perpendicularly through the image.

A system and/or method in some embodiments detect bounding boxes that contain rotated objects which are oriented differently and/or offset from a standard vertical and/or horizontal orientation. For example, an object with a central axis that runs offset from the perpendicular vertical and/or the perpendicular horizontal lines through an image is oriented differently and/or offset from the standard vertical and/or horizontal orientation. Detecting bounding boxes with rotated objects can improve rotated object detection. A method, for example, in some embodiments realizes rough object detection based on general object detection, then, by iteratively correcting an angle and size of a bounding box (also referred to as a detection box), the method finds an optimal position and size of the bounding box, which in turn allows the so-altered image to be input into an object detection machine learning model to achieve accurate detection of an object contained with the bounding box. Generally, in some embodiments, the method includes the following process.

Rough object detection includes using a general or existing object detection algorithm to realize an initial positioning and framing of an object detection box. Bounding box correction and more accurate positioning continuously fine-tunes the object detection box identified during rough object detection to find an optimal position and size of the detection box. An evaluation function evaluates a new detection box and determines a best or improved object detection box and rotation angle.

In some embodiments, using conventional object detection tools, the system and/or method set a variety of anchor points and predict raw bounding boxes based on the number of anchors points on an output feature map. In some embodiments, the anchor points refer to properties such as graph coordinates, an object score (e.g., foreground object or background), and a class score with respect to a particular number of classes. In the process, there are multiple candidate boxes generated at each position in the feature map. In some embodiments, the system and/or method define an object detection loss function with soft labels to identify potential bounding boxes. "Soft label" refers to a more flexible or probabilistic representation of the ground truth or true label associated with a bounding box or object class. Then using redundant candidate boxes and current content of a candidate box, the system and/or method estimate the rotation angle of the detected object. The neural network was trained with a modified loss optimization using a soft label (probability score) as the true positive instead of always using "1" as the true positive score. Using the neural network so trained helps identify more boxes that are candidates for rotation and helps obtain higher object confidence during prediction/inference. "Redundant candidate boxes" refer to multiple bounding boxes that cover the same or similar areas within an image. "Current content of a candidate box" refers to information contained within a specific bounding box generated by an object detection algorithm or tool at a stage during a detection process. The system and/or method use one or more evaluation functions to determine an appropriate angle for rotating the contents of the detected bounding box and then rotate the detected bounding box by the determined rotation angle and input the rotated image into the machine learning model for machine learning object detection.

Figure 3:
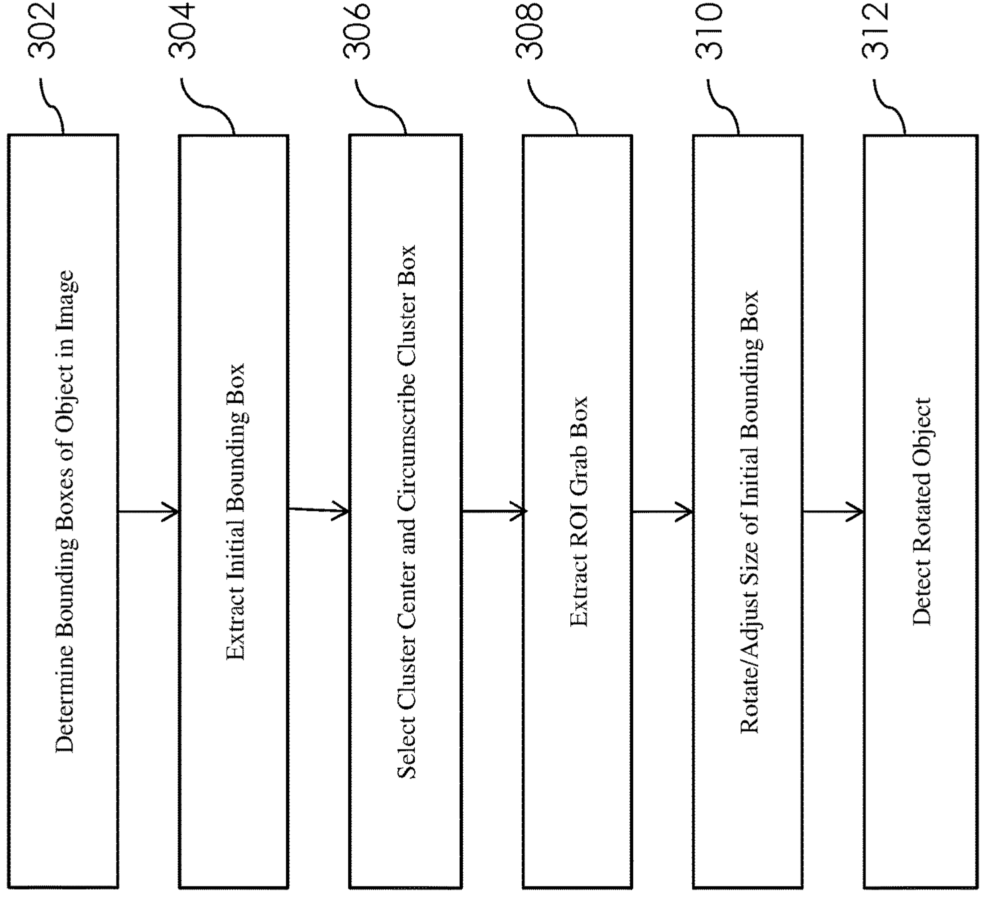
FIG. 3 is a diagram illustrating a method of detecting rotated objects in some embodiments.

FIG. 3 is a diagram illustrating a method of detecting rotated objects in some embodiments. For example, in some embodiments, an improvement or change is made to an existing object detection method or tool such that commonly filtered-out candidate bounding boxes with low confidence values are kept in a pool of candidate bounding boxes by changing the object loss function (e.g., loss function of a neural network) with a soft label. Rotation features are extracted based on the candidate bounding boxes. Additionally, rotation features are extracted based on the content of the bounding boxes. Rotational adjustments are then made to the bounding boxes.

Figures 4A, 4B:
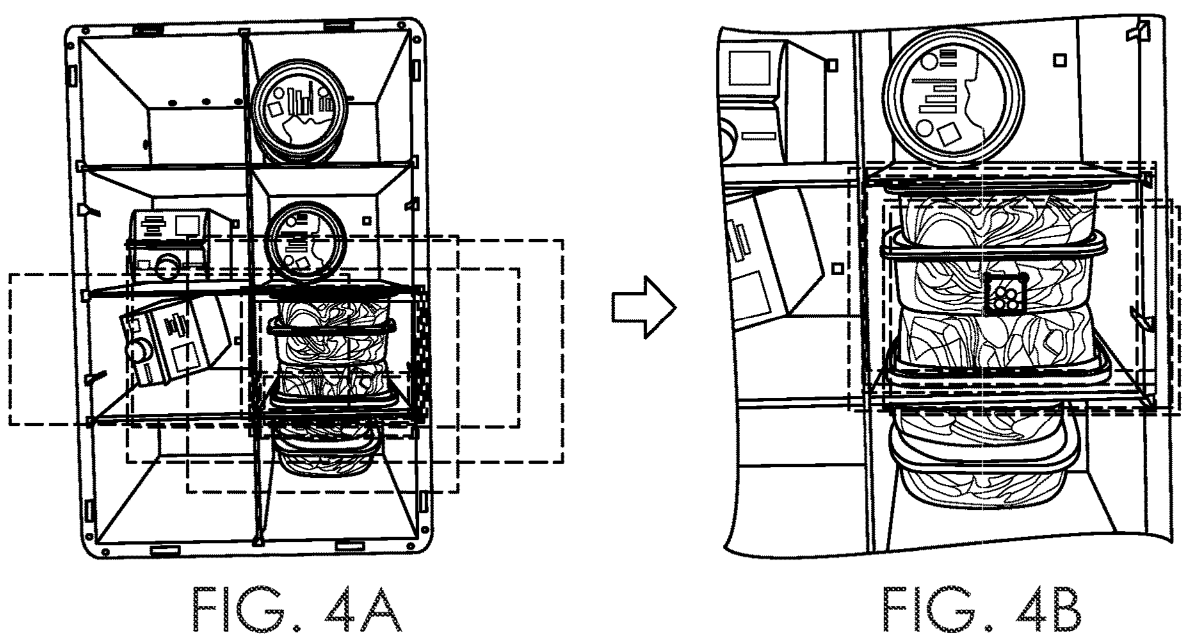
FIG. 4A shows bounding boxes of an example image in some embodiments.
FIG. 4B shows bounding boxes, which are further filtered in some embodiments.

At 302, the method includes determining bounding boxes of an object in an image using a neural network, e.g., by making an improvement or change to an existing object detection method. An example of such existing object detection method includes an end-to-end neural network that predicts bounding boxes and probabilities for detected objects. For instance, a machine learning model, for example, a neural network such as a deep convolutional neural network is trained using a training data set that includes multiples of images of objects, to be able to during inference stage, detect those objects in previously unseen images. Such a trained neural network in its inference phase, takes an image as input and detects objects in the image. Such object detection or prediction can be performed in real time. In some embodiments, changing an existing object detection method includes modifying a calculation of object loss performed by a neural network in the existing object detection method, thereby improving loss of such object detection method. For instance, an existing object detection method may decide whether a candidate bounding box includes pixels that are "foreground" or "background" according to an intersection-over-union (IoU) threshold. Briefly, intersection-over-union (IoU), also known as the Jaccard index, is a commonly used measure for determining how accurate a candidate image segmentation is. Normally, in a loss function, a false positive (FP) foreground box (candidate bounding box designated as FP foreground) is suppressed with a mask of −1, and a true positive (TP) foreground box (candidate bounding box designated as TP foreground) is rewarded with a mask of 1. In some embodiments, the system and/or method disclosed herein change the mask of TP in the loss function to the IoU value and calculate the mask of TP as a soft label, e.g., with one or more probability scores within a range instead of a binary label. This soft label allows an object detection model to be trained to regress toward higher IoU values between predicted bounding boxes and ground truth bounding boxes rather than relying solely on binary classification (correct or incorrect). By using IoU as a soft label, the model is encouraged to learn not only to predict the presence of an object but also to refine the bounding box predictions toward more accurate localization by considering the degree of overlap between predicted and ground truth boxes. This mechanism enables more candidate boxes to obtain higher object confidence during prediction. For example, using a sample image shown in FIG. 2A, an improved object loss function of an existing object detection method can be applied. FIG. 4A shows bounding boxes determined at 302 using the improved object loss function, in some embodiments.

At 304, an initial bounding box for an object in the image is extracted or determined using the neural network. For example, an existing object detection method or neural network detects an initial bounding box for an object in an image. Such an initial bounding box for an object is extracted or determined based on selecting a bounding box that has the highest confidence value among candidate bounding boxes associated with that object.

For example, in some embodiments, using a non-maximum suppression (NMS) process, a single initial bounding box associated with an object is selected out of the candidate bounding boxes associated with the object. Briefly, an NMS process is a computer vision method that selects a single entity out of many overlapping entities (for example bounding boxes in object detection) which has a highest confidence score. Entities that have a significant (e.g., greater than a predetermined threshold value) overlap with the selected bounding box are removed. In some embodiments, performing the NMS process obtains an initial bounding box per an object that is being detected. For simplicity of explanation, an initial bounding box of an image is referred to as "R1". By way of example, FIG. 2A shows multiple initial bounding boxes corresponding to multiple objects in the image extracted by inputting the image into a neural network such as a convolutional neural network.

At 306, the method includes selecting a cluster center of the bounding boxes and circumscribing a cluster box around the cluster center. The method in some embodiments extracts boxes that are candidates for rotation and selects the cluster center, respectively, for the extracted candidate boxes. "Boxes that are candidates for rotation" refer to boxes which have successfully passed some filtering process for removing unsuitable bounding boxes. The extracted boxes can be used for estimating a rotation angle of a detected object that is within the respective extracted box. For example, in some embodiments, extracting a box that is a candidate for rotation includes obtaining all boxes associated with an object before a non-maximum suppression (NMS) process, whose confidence values are greater than a threshold value (e.g., 10e-1), calculating IoU with a correct candidate box (referred to as "candidate box A" for simplicity of explanation), and filtering out candidate bounding boxes whose IoU threshold is less than a defined value, e.g., 0.3. A "correct candidate box" or "candidate box A" here is a specific candidate box that is considered as a reference or ground truth associated with the object. The R1 box is an example of such a ground truth or reference box. Noise boxes which have a large or long distance are filtered out. FIG. 4B shows bounding boxes (e.g., boxes that are candidates for rotation), which are filtered from bounding boxes shown in FIG. 4A, in some embodiments.

Figure 4C:
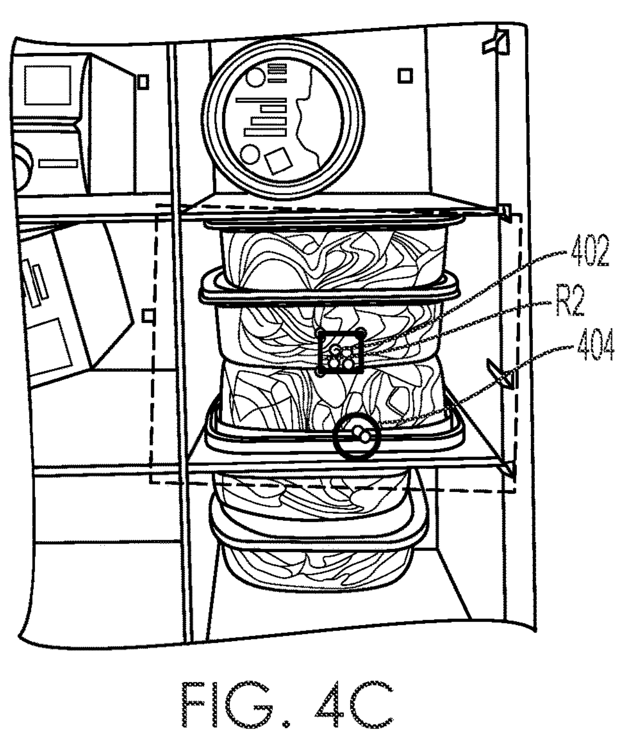
FIG. 4C shows clustered points and outliers of a bounding box in some embodiments.

In some embodiments, the method calculates a score-weighted center point of a box (for all candidate boxes that were obtained before the NMS process described above, and whose confidence values are above a pre-configured threshold, e.g., 10e-1), runs Density-Based Spatial Clustering of Applications with Noise (DBSCAN) within all center points, and selects a cluster with most points. Other points which can represent noise are removed. A weighted average of box centers based on confidence scores gives a central point to choose a box. Calculating a score-weighted center point of a box refers to a method used to calculate a representative point within a bounding box, taking into account the confidence scores or scores associated with that particular bounding box. By using this score-weighted method, higher-confidence boxes will contribute more to the calculation of the center point, potentially leading to a more representative point that considers the confidence level associated with each box while determining the overall center point of the detected objects. Briefly, DBSCAN is a clustering algorithm used for data analysis and pattern recognition. DBSCAN groups data points based on their density-identifying clusters of high-density region and classifying outliers as noise. FIG. 4C shows clustered points and outliers of a bounding box in some embodiments. The method in some embodiments keeps a cluster center 402 (centers of bounding boxes) of bounding boxes and removes outliers 404. A cluster selected with the most points means that the box wraps the contained object closely.

In some embodiments, the method also includes calculating its circumscribed rectangle (referred to as "rectangle C" for simplicity of explanation) based on the select clustered. This is also called "cluster box" or "R2" for simplicity of explanation. The term "circumscribed rectangle" or "cluster box" or "R2" refers to a bounding box that is generated based on the points clustered together using the DBSCAN algorithm. Calculating the circumscribed rectangle (e.g., cluster box or rectangle C) includes performing DBSCAN clustering, selecting a cluster, and performing circumscribed rectangle calculation (e.g., defining a box around the cluster). The circumscribed rectangle or cluster box R2 surrounds the object and the selected cluster points. In some instances, the rectangle is generated in a multi-step process which includes first generating a convex hull that surrounds all points of the selected cluster and then second generating the rectangle to cover the convex hull.

Referring to FIG. 3, at 308, the method includes extracting rotation features based on the content of a bounding box, e.g., extracting a region of interest grab box by iteratively performing a graph cut algorithm starting with the cluster box as an initial area in the image and obtaining a segmented area until a criterion is met. The segmented area is used as the initial area in the next iteration. For example, in some embodiments, main content is extracted using a graph cut algorithm. Briefly, graph cut (e.g., as applied in computer vision) is a segmentation technique that is used to segment an image into foreground and background elements. In graph theory, a cut is a partition of the vertices of a graph into two disjoint subsets (e.g., background and foreground elements). The output of an image segmentation is a segmentation mask that represents the specific pixel-by-pixel boundary and shape of each class-typically corresponding to different objects, features or regions in the image. Different visual characteristics are used to indicate to which class a particular pixel belongs, e.g., to a background or a foreground class. Thus, a segmentation map in some embodiments shows all background pixels as a first color, e.g., black, and all foreground pixels as one or more second colors.

In some embodiments, a grab cut algorithm is implemented here as a sub-type of a graph cut algorithm. Starting with a bounding box around an object to be segmented, the grab cut algorithm estimates the color distribution of the target object and that of the background using a Gaussian mixture model. The color distribution is used to construct a Markov random field over the pixel labels, with an energy function that prefers connected regions having the same label. The grab cut algorithm runs a graph cut based optimization to infer their values. This two-step procedure is repeated until convergence. If in a particular iteration more boundary regions around the object are identified as being part of the object instead of part of the background, the size of the object has changed.

In some embodiments, a bounding box (referred to as "rectangle C" for simplicity of explanation (also referred to above as a cluster box R2)) obtained at 306 is used as an initial region of interest (ROI) of an image, to which the graph cut algorithm is applied. Applying the graph cut algorithm to the ROI results in a segmented area, e.g., referred to as "A1" for simplicity of explanation. A circumscribed area (referred to as "rectangle D" for simplicity of explanation) is calculated based on A1. Rectangle D is used as ROI again to which the graph cut algorithm is applied again. This process repeats until a criterion is met, for example, the size of the graph cut area does not change (or change minimally based on a threshold value) from one iteration to next iteration of graph cut. The size refers to the size of some object within the bounding box or to a size of a bounding box that surrounds the object without touching the object. These iterations result in obtaining a final graph cut area (referred to as "A" for simplicity of explanation). The final graph cut area is also referred to as "ROI grab Box R3" for simplicity of explanation. The content contained in the "ROI grab Box R3" or "A" represents the segmented region obtained after the iterative graph cut process converges. ROI grab Box R3 or A is derived from the iterative refinement of an initial bounding box (R1). The final segmented area (ROI grab Box R3 or A) may be a subset of the area covered by R1, e.g., if the iterative refinement process identifies a more precise region containing the object within the initial bounding box R1. The references herein to a graph cut algorithm in some embodiments refer to a grab cut algorithm.

"Rectangle C" serves as an initial region of interest obtained from clustering. In some embodiments, the size of the rectangle C may be smaller than other larger bounding boxes such as "A1" or "rectangle D." The graph cut algorithm is applied specifically to this smaller region to refine the segmentation within that area of interest. In some embodiments, the refined segmentation obtained after multiple iterations may expand an effective "coverage" of a segmented object within the initial ROI, effectively refining the delineation or extending the area considered as part of the object.

"Rotation features" refer to specific characteristics or attributes within the content of a bounding box that are indicative or informative about the rotation of an object contained within that box. In some embodiments, rotation features can be extracted directly from the content within the bounding box and rectangle C serves as a representation of clustered points within the box. Both rotation features and rectangle C can contribute to the process of accurately detecting and adjusting for rotated objects. Rotation features act as informative indicators that assist in estimating, adjusting, and refining the detection of rotated objects within the bounding boxes. Rotation features provide visual cues and characteristics that enable a process to better understand and adapt to rotation of objects, leading to more accurate and reliable detection results.

Figure 5:
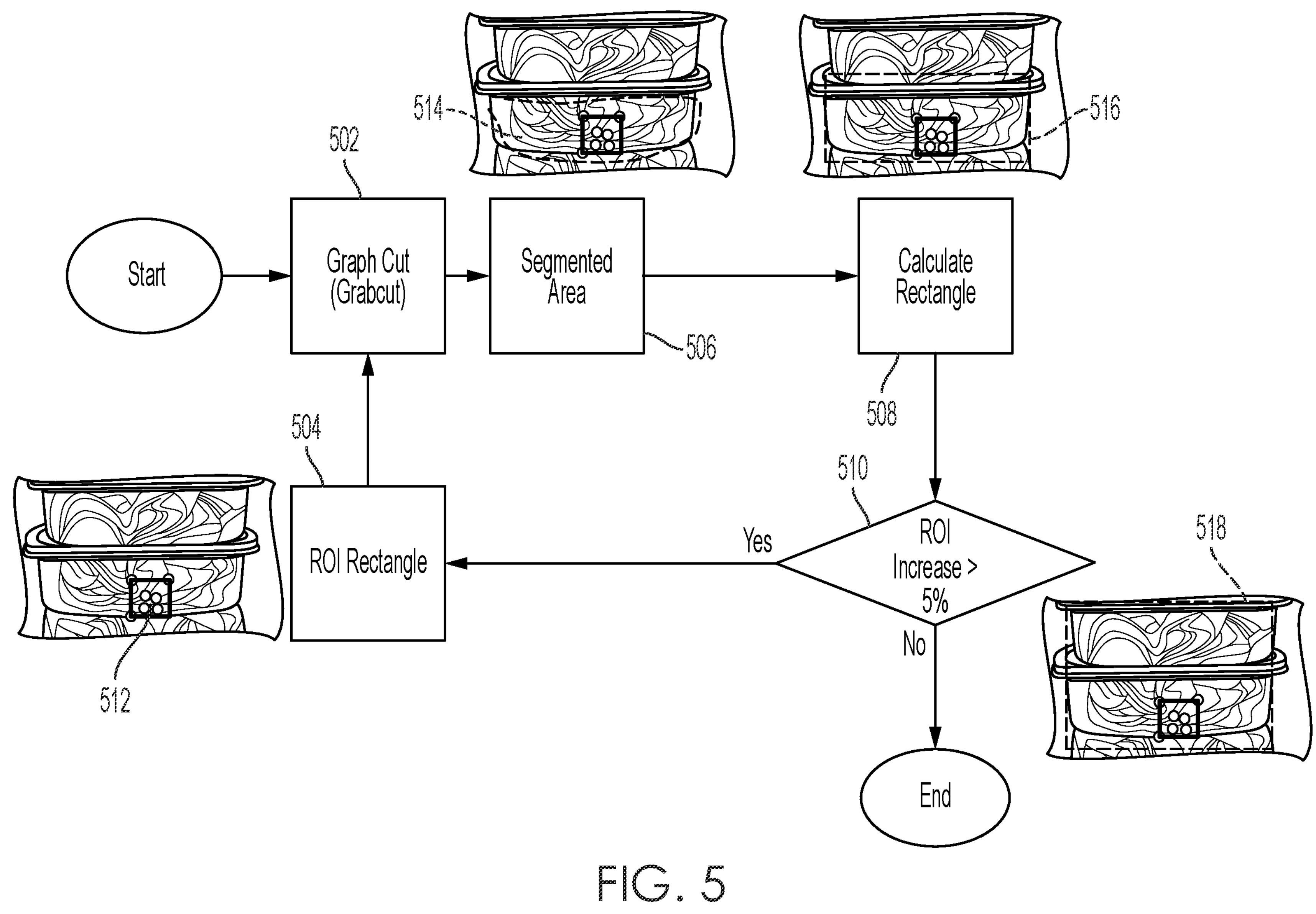
FIG. 5 illustrates extracting of a content area of a bounding box using a graph cut algorithm in some embodiments.

FIG. 5 illustrates extracting of a content area (e.g., a region of interest grab box described with reference to FIG. 3 at 306) using graph cut algorithm in some embodiments. Initially, at 502, a graph cut algorithm is applied to an initial ROI area. In a first iteration, the initial ROI area is received as the cluster box R2 (e.g., shown at 512) from the process shown in FIG. 4. Applying the graph cut algorithm results in a segmented area at 506 (e.g., A1). The cluster box R2 represents an area within the image where the graph cut segmentation process may begin. Area at 514 represents a segmented area obtained after an application of the graph cut algorithm to the initial ROI. Area at 514 shows a result of an iteration of the graph cut process. At 508, a circumscribed area (e.g., rectangle D) is calculated based on A1. Area at 516 represents a bounding box or area calculated based on the segmented area (A1) obtained from the graph cut algorithm. Area at 516 is derived from the segmented area and is used to define a new ROI for the next iteration. The area refers to a box which surrounds the identified object from the segmentation result/output. This box touches the identified object or frames the identified object without touching same. At 510, if the increase in ROI is greater than a threshold value (e.g., 5%), the method iterates by proceeding to 504, where the current ROI is used at 504. Otherwise, the iteration ends. The processing at 510 checks if the change, e.g., increase in the ROI area (e.g., the difference between the current ROI and the previous one) is greater than a predefined threshold value, such as 5%. If the increase is significant, the iteration continues by proceeding to 504 with the updated ROI. Then the same steps that were performed before are repeated starting from the new ROI instead of from the cluster box R2. If the increase in ROI is not significant, the iteration process ends. For example, segment shown at 518 represents an ROI of the final or last iteration in a group of iterations.

Figure 6:
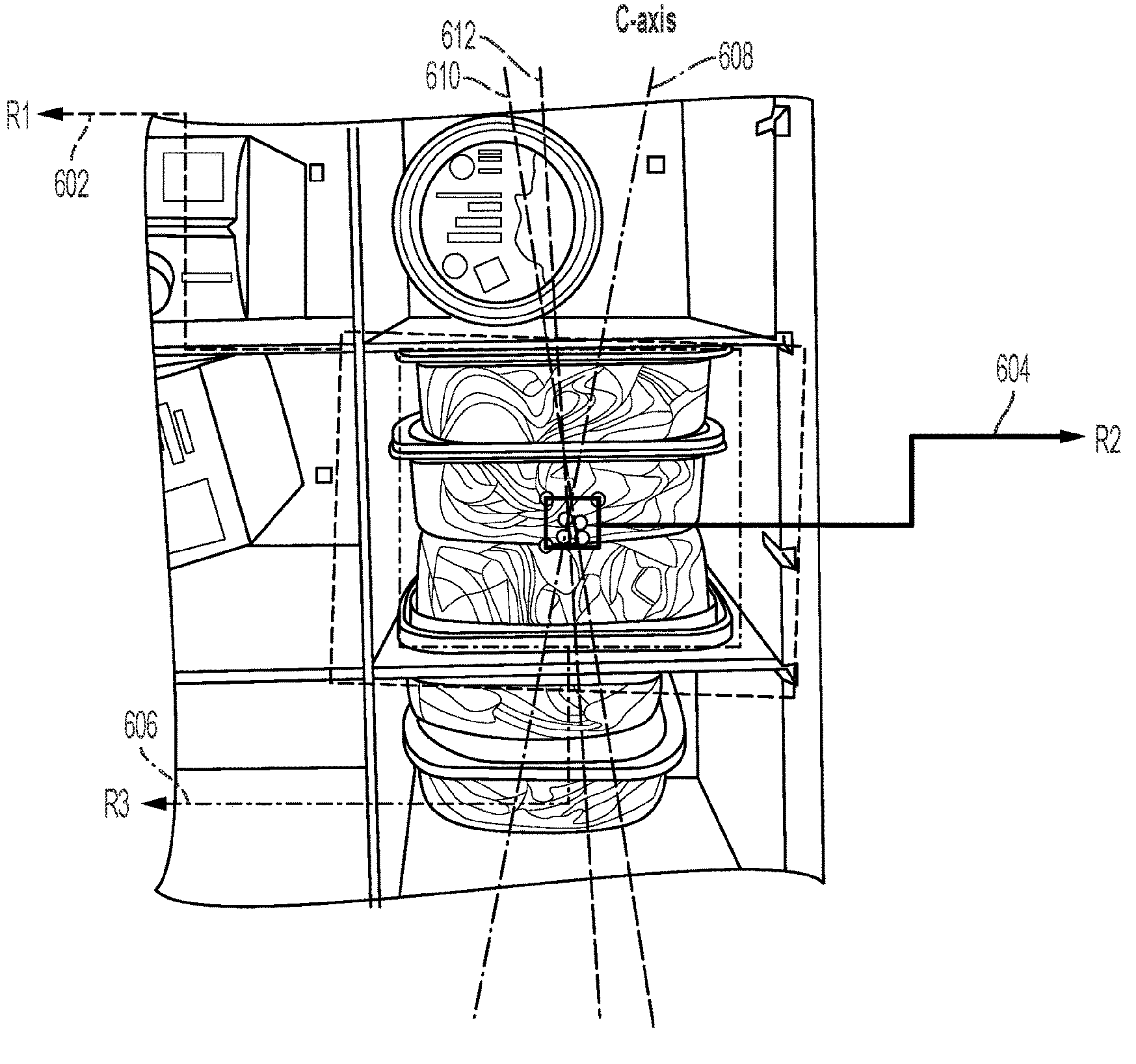
FIG. 6 shows examples of original detected bounding box, a cluster box and a region of interest (ROI) grab box in some embodiments.

Referring back to FIG. 3, at 310, the method includes performing rotation and evaluation, e.g., rotating the initial bounding box and contents of the initial bounding box according to a rotation angle determined based on the cluster box. In some embodiments, rotation angle and size of the initial bounding box can be adjusted based on the cluster box and the region of interest grab box. For example, in some embodiments, performing rotation and evaluation uses three image areas determined at 302, 304 and 306, for example, original detected or initial bounding box (R1), cluster bounding box (R2, also referred to as cluster box) and ROI grab box (R3). FIG. 6 shows examples of original detected or initial bounding box (R1), cluster bounding box (R2, also referred to as cluster box) and ROI grab box (R3) in some embodiments. In some embodiments, the rotation angle and the size of the original detected or initial bounding box R1 602 can be refined based on R2 604 and R3 606. For instance, the method finds central axis (C-axis) 608 for R1 602 and attempts to rotate the central axis 608 by an angle repeatedly (e.g., shown at 610 and 612 by way of example) until the points in R2 604 are divided into two parts, and the number of points on one side of the central axis are the same or substantially the same (plus or minus a threshold number) as the number of points on the other side of the central axis. The rotation angle where the points in R2 is divided into two equal or substantially equal parts, is recorded as a target angle. Thus, the method taps into features of symmetry for objects to help identify the amount of rotation, e.g., the rotation angle, for the orientation of the object.

The edges of R1 are adjusted and the intersection over union (IoU) of R3 and R1 is calculated. For example, the method sets a step value. The step value can be pre-configured. The method reduces the left and right, e.g., the lateral, edges with the step value, which obtains a new R1. The method calculates the IoU of new R1 and R3. If the IoU is increased, the method continues to adjust the top and bottom edge and gets another new R1, then calculates the IoU again, and if the IoU is increased, continues to adjust. If the IoU is decreased, the last adjustments is taken as a target R1. Adjusting R1, e.g., after defining R2 and determining a rotation angle, for example, as described above, further refines the bounding box to better align it with the segmented area represented by R3 (the ROI grab box). The adjustments find the best-fitting edges of R1 with R3 by iteratively modifying the bounding box dimensions based on the IoU metric, improving the accuracy of the bounding box localization around the detected object.

In some embodiments, the size adjustment and the rotation adjustment are performed together to optimize the initial bounding box modification. An optimal set of the size adjustment and rotation angle are determined via the program automatically exploring the combinations and finding an optimum pair. An optimum rotation angle can have a subpar intersection over union score. In some embodiments, the two values are weighted equally for the optimization. In some embodiments, one of the two values, e.g., the angle of rotation, is weighted more heavily for this optimization.

At 312, the method includes, based on the rotation angle and size of the bounding box, detecting an object inside of the bounding box using a trained machine learning algorithm. In some embodiments, the method uses the refined rotation angle and size parameters to narrow down the focus area for object detection. The trained machine learning algorithm then operates within this specific bounding box to recognize and determine the presence and localization of objects within that defined region. In some embodiments, the initial bounding box and its contents such as the outlined object therein are rotated according to the determined rotation angle. The rotated and/or size-adjusted initial bounding box and its contents are then input into the trained machine learning algorithm. In some embodiments, the rotated and/or size-adjusted initial bounding box alone is input into the trained machine learning algorithm. In other embodiments, the entire initial image is input into the trained machine learning algorithm as an altered image due to the initial bounding box and its contents being rotated and/or size-adjusted while remaining portions of the initial image are not changed. The rotation and size adjustments enhance the accuracy of object detection by aligning the bounding box more accurately with the actual object's orientation and size. In some embodiments, the method provides for an overall workflow for performing a rotated object detection. An optimized rotation generator based on candidate boxes and content of the boxes is provided. In some embodiments, the method involves using an optimization technique, for example, using a graph cut technique, in conjunction with machine learning algorithms to iteratively adjust or generate rotations of bounding boxes, aiming to improve the accuracy of object detection, particularly for rotated objects within images.

In some embodiments, the method allows for decreasing overall efforts for preparing data for object detection machine learning or training. The method allows for detecting rotated objects.

In some embodiments, the method need not require any modification of training data. For example, the method obtains a rotation angle by correcting a detection area. From the perspective of rotation angle acquisition, the method can be completely unsupervised and need not require any rotational training data. The method simplifies rotated object detection by not needing to make a correction to original training data, by directly using results of a detection bounding box, then by correcting the results of the detection bounding box, and by iteratively rotating the detection bounding box until a target can be optimally marked.

A particular application or use case can include product positioning, classification and/or counting, for example, for inventory or stocking of shelves in stores or warehouses. Being able to use original training data including images to train an automatic object detection machine learning algorithm to detect rotated objects can reduce the amount of labeled training data for detecting objects that appear rotated in various angles or perspectives in images. Reducing the amount of data that needs to be processed relieves computation resources to perform other processing tasks, increasing computational processing speed as a result.

If the methods herein are applied to an object which is already axis-aligned and not rotated, the various steps described above are still performed but the angle rotation and/or size adjustment of the initial bounding box are so small that there is no impact to the object detection that the machine learning algorithm performs (where the machine learning algorithm was trained with axis-aligned images).

Although some of the examples and drawings showed an angled peripheral region (e.g., segment of a shopping/good box), the methods herein help detect rotated objects that could be within such a rotated peripheral region. The methods herein for rotating the image portion to an appropriate rotation angle rotate both a peripheral region such as the shopping box square and the internal portion found therein (e.g., some product or good disposed within that shopping box square).

Figure 7:
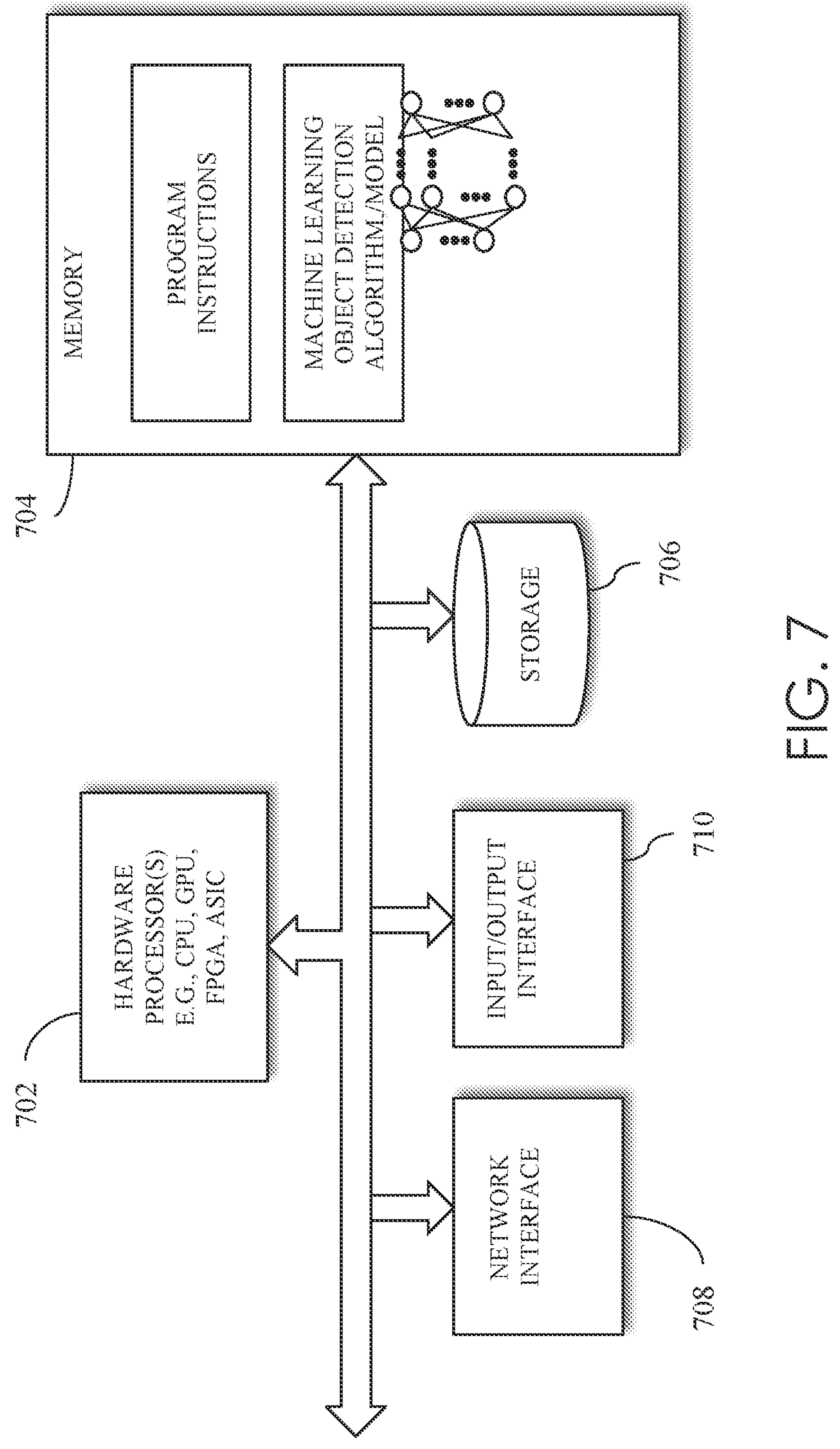
FIG. 7 shows examples of components of a computer system that can implement a rotated object detection in some embodiments.

FIG. 7 is a diagram showing example components of a system in some embodiments that can perform rotated object detection. One or more hardware processors 702 such as a central processing unit (CPU), a graphic process unit (GPU), and/or a Field Programmable Gate Array (FPGA), an application specific integrated circuit (ASIC), and/or another processor, may be coupled with a memory device 704, and perform rotated object detection. A memory device 704 may include random access memory (RAM), read-only memory (ROM) or another memory device, and may store data and/or processor instructions for implementing various functionalities associated with the methods and/or systems described herein. One or more processors 702 may execute computer instructions stored in memory 704 or received from another computer device or medium. A memory device 704 may, for example, store instructions and/or data for functioning of one or more hardware processors 702, and may include an operating system and other program of instructions and/or data. Data used by one or more hardware processors 702 may be stored in a storage device 706 or received via a network interface 708 from a remote device, and may be temporarily loaded into a memory device 704 for performing rotated object detection. One or more hardware processors 702 may be coupled with interface devices such as a network interface 708 for communicating with remote systems, for example, via a network, and an input/output interface 710 for communicating with input and/or output devices such as a keyboard, mouse, display, and/or others.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in some embodiments" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:

determining bounding boxes in an image using a neural network;

extracting an initial bounding box for an object in the image;

selecting a cluster center of the bounding boxes and circumscribing a cluster box around the cluster center;

rotating the initial bounding box and contents of the initial bounding box according to a rotation angle determined based on the cluster box; and detecting the object in the rotated initial bounding box using a trained machine learning model.

2. The computer-implemented method of claim 1, further comprising:

extracting a region of interest grab box by iteratively performing a graph cut algorithm starting with the cluster box as an initial area and obtaining a segmented area, wherein the segmented area is used as the initial area in a next iteration, and wherein the iterations continue until a criterion is met;

adjusting a size of the initial bounding box based on the region of interest grab box, wherein the detecting the object using the trained machine learning model occurs with the size-adjusted initial bounding box.

3. The computer-implemented method of claim 1, further comprising training the neural network by using an intersection over union value as a respective mask of a true positive determination for a loss function for the neural network.

4. The computer-implemented method of claim 1, further including performing a non-maximum suppression process to select the initial bounding box among the bounding boxes.

5. The computer-implemented method of claim 1, wherein the selecting of the cluster center of the bounding boxes includes determining a representative pixel point within each of the bounding boxes, clustering representative pixel points of the bounding boxes, and identifying a cluster with highest density region of representative pixel points.

6. The computer-implemented method of claim 2, wherein the criterion is met if a difference in size of the segmented area and the initial area is less than a predefined threshold.

7. The computer-implemented method of claim 2, wherein the rotation angle of the initial bounding box is determined by finding a central axis of the initial bounding box, rotating the central axis by an angle repeatedly until pixel points in the cluster box are divided into two equivalent parts by the central axis, wherein the angle at which the pixel points in the cluster box are divided into two equivalent parts by the central axis is used as a target rotation angle.

8. The computer-implemented method of claim 2, wherein the adjusting the size of the initial bounding box includes adjusting edges of the initial bounding box based on an intersection-over-union value of the region of interest grab box and the initial bounding box.

9. A computer program product comprising:

a set of one or more computer readable storage media; and program instructions, collectively stored in the set of one or more storage media, for causing a processor set to perform the following computer operations:

determine bounding boxes in an image using a neural network;

extract an initial bounding box for an object in the image;

select a cluster center of the bounding boxes and circumscribe a cluster box around the cluster center;

rotate the initial bounding box and contents of the initial bounding box according to a rotation angle determined based on the cluster box; and detect the object in the rotated initial bounding box using a trained machine learning model.

10. The computer program product of claim 9, wherein the program instructions further cause the processor set to:

extract a region of interest grab box by iteratively performing a graph cut algorithm starting with the cluster box as an initial area and obtaining a segmented area, wherein the segmented area is used as the initial area in a next iteration, and wherein the iterations continue until a criterion is met; and adjust a size of the initial bounding box based on the region of interest grab box, wherein the device is caused to detect the object using the trained machine learning model with the size-adjusted initial bounding box.

11. The computer program product of claim 9, wherein the program instructions further cause the processor set to train the neural network by using an intersection over union value as a respective mask of a true positive determination for a loss function for the neural network.

12. The computer program product of claim 9, wherein the program instructions further cause the processor set to perform a non-maximum suppression process to select the initial bounding box among the bounding boxes.

13. The computer program product of claim 9, wherein the program instructions further cause the processor set to, in the selecting of the cluster center of the bounding boxes, determine a representative pixel point within each of the bounding boxes, cluster representative pixel points of the bounding boxes, and identify a cluster with highest density region of representative pixel points.

14. The computer program product of claim 10, wherein the criterion is met if a difference in size of the segmented area and the initial area is less than a predefined threshold.

15. The computer program product of claim 10, wherein the rotation angle of the initial bounding box is determined by finding a central axis of the initial bounding box, rotating the central axis by an angle repeatedly until pixel points in the cluster box are divided into two equivalent parts by the central axis, wherein the angle at which the pixel points in the cluster box are divided into two equivalent parts by the central axis is used as a target rotation angle.

16. The computer program product of claim 10, wherein the program instructions further cause the processor set to, in the adjusting the size of the initial bounding box, adjust edges of the initial bounding box based on an intersection-over-union value of the region of interest grab box and the initial bounding box.

17. A computer system comprising:

a processor set;

a set of one or more computer-readable storage media; and program instructions, collectively stored in the set of one or more storage media, for causing the processor set to perform the following computer operations:

determine bounding boxes in an image using a neural network;

extract an initial bounding box for an object in the image;

select a cluster center of the bounding boxes and circumscribe a cluster box around the cluster center;

rotate the initial bounding box and contents of the initial bounding box according to a rotation angle determined based on the cluster box; and detect the object in the rotated initial bounding box using a trained machine learning model.

18. The system of claim 17, wherein the program instructions further cause the processor set to:

extract a region of interest grab box by iteratively performing a graph cut algorithm starting with the cluster box as an initial area and obtaining a segmented area, wherein the segmented area is used as the initial area in a next iteration, and wherein the iterations continue until a criterion is met; and adjust a size of the initial bounding box based on the region of interest grab box, wherein the device is caused to detect the object using the trained machine learning model with the size-adjusted initial bounding box.

19. The system of claim 17, wherein the program instructions further cause the processor set to train the neural network by using an intersection over union value as a respective mask of a true positive determination for a loss function for the neural network.

20. The system of claim 17, wherein the program instructions further cause the processor set to perform a non-maximum suppression process to select the initial bounding box among the bounding boxes.

* * * * *